(12) United States Patent
Ng et al.

(10) Patent No.: US 8,168,073 B2
(45) Date of Patent: May 1, 2012

(54) WASTE CONCRETE AND AGGREGATE RECLAIMER

(75) Inventors: Khee Yang Ng, Singapore (SG); Samuel Wong, Sydney (AU); Giau Leong Low, Singapore (SG); Wei Leng Ng, Singapore (SG); Giok Lak Sim, Singapore (SG)

(73) Assignee: SP-ZI-COM Pte Ltd, SG (SG)

( * ) Notice: Subject to any disclaimer, the term of this patent is extended or adjusted under 35 U.S.C. 154(b) by 695 days.

(21) Appl. No.: 11/658,677

(22) PCT Filed: Jul. 28, 2005

(86) PCT No.: PCT/SG2005/000256
§ 371 (c)(1),
(2), (4) Date: Sep. 9, 2009

(87) PCT Pub. No.: WO2006/011858
PCT Pub. Date: Feb. 2, 2006

(65) Prior Publication Data
US 2009/0314726 A1    Dec. 24, 2009

(30) Foreign Application Priority Data
Jul. 28, 2004   (SG) ............................... 200404352-7

(51) Int. Cl.
*B01D 21/04*   (2006.01)
(52) U.S. Cl. ........ 210/802; 210/803; 210/259; 210/521; 210/526
(58) Field of Classification Search .............. 210/801, 210/802, 803, 259, 521, 522, 523, 525, 526
See application file for complete search history.

(56) References Cited

U.S. PATENT DOCUMENTS

| | | | | | |
|---|---|---|---|---|---|
| 554,815 | A | * | 2/1896 | Field | 210/521 |
| 2,230,386 | A | * | 2/1941 | Pecker | 210/521 |
| 2,267,608 | A | * | 12/1941 | Hawley | 210/803 |
| 2,693,880 | A | * | 11/1954 | Schoenfeld | 210/521 |
| 3,140,774 | A | * | 7/1964 | Johnston et al. | 210/526 |
| 3,482,694 | A | * | 12/1969 | Culp et al. | 210/522 |
| 3,674,145 | A | * | 7/1972 | Schmutzler et al. | 210/801 |
| 3,903,000 | A | * | 9/1975 | Miura et al. | 210/521 |
| 3,923,659 | A | * | 12/1975 | Ullrich | 210/521 |
| 4,663,042 | A | * | 5/1987 | Rasper et al. | 210/526 |
| 4,701,260 | A | * | 10/1987 | Lee | 210/521 |
| 4,747,948 | A | * | 5/1988 | North | 210/521 |
| 4,816,157 | A | * | 3/1989 | Jennelle | 210/521 |
| 4,927,543 | A | * | 5/1990 | Bablon et al. | 210/521 |
| 4,950,398 | A | * | 8/1990 | Wiegand et al. | 210/526 |
| 5,336,417 | A | * | 8/1994 | Hannum | 210/803 |
| 5,460,727 | A | * | 10/1995 | Davis | 210/526 |
| 5,605,636 | A | * | 2/1997 | Wyness | 210/802 |
| 5,947,299 | A | * | 9/1999 | Vazquez et al. | 209/157 |
| 6,042,722 | A | * | 3/2000 | Lenz | 210/521 |
| 2006/0108281 | A1 | * | 5/2006 | Tuomikoski | 210/526 |

* cited by examiner

*Primary Examiner* — Christopher Upton
(74) *Attorney, Agent, or Firm* — Hogan Lovells US LLP

(57) ABSTRACT

A reclaimer, for the separation of heavier solids from slurry water, including an inlet means (50) to allow loading of a flow of the solid laden slurry water (90), a reclaiming tank (10) to contain the input from the inlet means (50), a plurality of lamella plates (20) to increase the effective separation surface area to improve the separation process, said lamella plates (20) provided at an angle, an agitation mechanism (40) for loosening up the slurry water from the heavier solids, an outlet means (82) to allow the separated slurry water to exit the tank (10), wherein the agitation mechanism (40) is a conveyor, with a plurality of protrusions (42).

16 Claims, 5 Drawing Sheets

WASTE CONCRETE AND AGGREGATE RECLAIMER

FIELD OF INVENTION

This invention relates to a method and apparatus of reclaiming solid aggregates from slurry water, and preferably removing fines from slurry water, resulting in clarified water. This invention has particular but not exclusive application in the concrete batching industry, and may be applicable in cases where the separation of solids from liquids is desired.

BACKGROUND OF THE INVENTION

In the concrete batching industry, disposal of excess concrete, waste concrete and the washing of mixer trucks and plants create an environmental concern, and is a costly one.

Settling ponds have been traditionally used to separate solids from liquids. Solid laden slurry water to be disposed is discharged into a first pond for initial separation. At a second pond, further residual materials settle out, leaving clarified water to be transferred to a third pond. This system allows heavier material to be separated through gravitational settling. These solids are then eventually physically removed. However, for effective settling to occur, large settling ponds are required. This is undesirable in land scarce areas, for example, Singapore.

It is now desired to separate one or more solids from one or more liquids where beforehand, each solid existed in suspension in each liquid, in the form of fines, or settled in the liquid, in the form of silt, granite and sand. The purpose of separation is the recovery of either the solids or the liquids or both for further processing or for the release of one or the other into the environment.

A number of devices have been invented for separating solid laden slurry water and particles of varying size into distinct, separate groups. Screens have been widely employed for this purpose.

Static screens have often been used, where it provides a liquid reservoir at the top, a weir over which liquid flows, and a sloped screen which allows filtered liquid to flow through while the suspended solids are being separated. The solids then fall off the lower end of the screen. Static screens, while allowing continuous screening, handle only relative low flow rates and thus a large screening area is required to handle large flow rates. Furthermore, since the screen must slope downwardly and because a relatively long length of screen is required for effective separation, the head of suspension required at the top of the screen is relatively large. Further, such reclaimers may also allow too much product into the screens, as there is no way to regulate the flow of the product through the static screens.

Rotary screens, comprising a hollow rotatable drum having a perforated screening wall and having means for the delivery of the suspension to the interior of the drum, are an improvement over static screens by virtue of the rotation. This rotation continually presents a fresh screening surface to the suspension, thus allowing larger flow rates to be handled than with static screens. However, this type of screening, depending on the size of the solids, can either pass through the perforations with the liquid, or clog the perforations.

Another type of separator is the screw type reclaimer. These reclaimers employ a screw type conveyor for advancing the product through a reclaimer cylinder or chamber. The screw reclaimers are required to extend along the entire length of the reclaimer cylinder. Screw type conveyor reclaimers are inefficient because they work against the force of gravity. Screw conveyors force the product up and through the reclaimer cylinder or chambers instead of allowing the force of gravity to efficiently move the product therethrough. Further, these types of reclaimers provide limited hydraulic capacity in that they are unable to take multiple truckloads of solid laden slurry water.

A further method of separating waste aggregates from liquids involves the use of buckets on screws. Aggregate is introduced into the buckets, by way of the rotating screw, and the aggregate is advanced away from the liquid, thus separating it. This type of system is also inefficient in that the rotating screw needs to take into account the weight of the individual buckets on the screws.

Besides mechanical means, polymer or chemical addition systems have also been introduced to improve the removal of solids. For example, coagulants and flocculants are added to ease removal of suspended solids from the slurry water. However, the addition of these chemicals and additives may alter the quality of the reclaimed material and liquids, and hence, is also undesirable.

It is an object of the present invention to overcome or at least ameliorate one or more of the above problems in the prior art.

Discussion of any one of the prior art mentioned above is not to be taken as an admission of the state of common general knowledge of the skilled addressee.

SUMMARY OF INVENTION

According to an aspect of the present invention, there is provided a solid matter separation apparatus adapted to separate solid matter from slurry liquid passing through a reservoir of the apparatus, the reservoir provided internally with a plurality of plates generally in a lamella-like arrangement, the plates adapted to receive thereon at least part of the solid matter from the slurry liquid as the slurry liquid moves relative to the plates, wherein the apparatus is provided with liquid-motion generating means adapted to generate a degree of motion in the slurry liquid in the reservoir relative to the plates.

Preferred aspects of the present invention are in accordance with the subject matter of subsidiary claims of the appended claims, and are imported into the description by reference.

In an embodiment of the invention, it is to be appreciated that the lamella plates increase the effective separation surface such that its maximum admissible hydraulic load is higher than that used in traditional reclaimer systems. The final distributed solids 91 form both larger concrete aggregates on the lower side of the lamella plates, and fines 92 on the upper side of the lamella plates. Thus, with the use of the lamella plates, short settling is achieved, as the effective separation area for flotation and sedimentation is increased.

In a preferred embodiment, the level of agitation, imparted by the agitation mechanism, can be controlled by a user. The purpose of this agitation mechanism is to agitate the solid aggregates and slurry water, to impart enough velocity to the solid laden slurry water to be above the settling velocity of the particles in the slurry water. Thus, there is no need for space consuming settling ponds. It can thus be appreciated that a higher agitation will impart a higher velocity. This will allow finer particles, with lower settling velocities in the solid laden slurry water to be agitated and rise up, and not settle at the bottom of the reclaiming tank. Thus, by controlling the level of agitation by adjusting the velocity of the agitation mechanism, a user will be able to control the size of particles that are to be settled at the bottom of the reclaiming tank.

In a further preferred embodiment of the invention, the reclaimer is further provided with a solid removal system. This solid removal system is to remove the settled heavy solids from the base of the reclaiming tank, to the exterior of the tank for further processing or for reuse, as the case might be.

In a preferred embodiment, the reclaiming tank further includes an indentation at an end of the reclaiming tank to provide a temporary storage for the settled solids.

Preferably, the solid removal system is a conveyor system that extends from the interior of the tank, and preferably from the indentation of the reclaiming tank, to the exterior of the tank, and thus conveying the waste aggregate that have settled.

In a preferred embodiment, the conveyor system is fitted with a plurality of protrusions on the belt, to allow the waste aggregate that settle towards the bottom of the reclaiming tank to be carried towards said end of the reclaiming tank by the protrusions or abutments.

In yet another preferred embodiment of the present invention, the reclaimer further includes a baffle plate to contain the turbulence that may be imparted when the solid laden slurry water is introduced into the reclaiming tank. This allows a larger hydraulic load to be introduced into the tank, without the need to meticulously meter the input into the tank.

According to yet another aspect of the invention, there is provided a solid matter separation apparatus adapted to separate solid matter from slurry liquid passing through a reservoir of the apparatus, the reservoir provided internally with a plurality of plates generally in a lamella-like arrangement, the plates adapted to receive thereon at least part of the solid matter from the slurry liquid as the slurry liquid moves relative to the plates, wherein the apparatus is provided with liquid-motion generating means which includes a fluid-driving mechanism that controls the speed of entry of slurry liquid into the reservoir.

Preferably, the liquid-motion generating means is a pressure inducing means.

In a preferred embodiment, the solid matter separation apparatus has lamella-like arrangement of plates, including a first and second set of plates wherein the plates of the first set interleave with the plates of the second set to form a convoluted passageway therebetween through which the slurry liquid is able to flow.

Preferably, the reservoir is defined by an inner peripheral surface, and at least some of the plates of the second set extend from the inner peripheral surface of the reservoir and protrude partly into the reservoir.

Still preferably, at least some of the plates of the first set extend from a support portion located in the reservoir and protrude from the support portion partly into the reservoir.

Preferably, the plates that extend from the support portion interleave with the plates that extend from the inner peripheral surface of the reservoir for form said convoluted pathway.

According to another aspect of the invention, there is provided a reclaiming system, for the separation of heavier solids and fines from slurry water, including an inlet means to allow loading of a flow of the solid laden slurry water, a reclaiming tank to contain the input from the inlet means, a plurality of lamella plates to increase the effective separation surface area to improve the separation process, an agitation mechanism, for loosening up the slurry water from the heavier solids, said agitation mechanism being a conveyor, with a plurality of protrusions or abutments, an outlet means, to allow the separated slurry water to exit the tank, a weir overflow containment device to collect said separated slurry water exiting the tank, a solid outlet means, a liquid outlet means, a plurality of lamella plates, said lamella plates provided in a first set and a second set, an inlet means and an agitation mechanism, wherein said reclaimer further includes a conveying means to convey slurry water collected in the weir overflow containment device to the inlet means of the clarifier.

According to yet another aspect of the invention, there is provided a method of separating solid matter from slurry liquid passing through a reservoir of a solid matter separation apparatus, providing the reservoir provided internally with a plurality of plates generally in a lamella-like arrangement, using the plates to receive thereon at least part of the solid matter from the slurry liquid as the slurry liquid moves relative to the plates, and using a liquid-motion generating means to generate a degree of motion in the slurry liquid in the reservoir relative to the plates.

DESCRIPTION OF FIGURES

In order that the invention might be more fully understood, embodiments of the invention will be described by way of example only, with reference to the accompanying drawings, in which.

The attached drawings are not necessarily drawn to scale.

DESCRIPTION OF EMBODIMENTS OF THE INVENTION

Reference will now be made in detail to the preferred embodiments of the invention, examples of which are illustrated in the accompanying drawings. The preferred embodiments of the invention are not intended to limit the invention in its broadest aspect to these embodiments. On the contrary, the invention is intended to cover alternatives, modifications and equivalents, which may be included within the spirit and scope of the invention as defined by the appended claims. Furthermore, in the following detailed description of the embodiments, numerous specific details are set forth in order to provide an understanding of the present embodiments.

Figure 1:
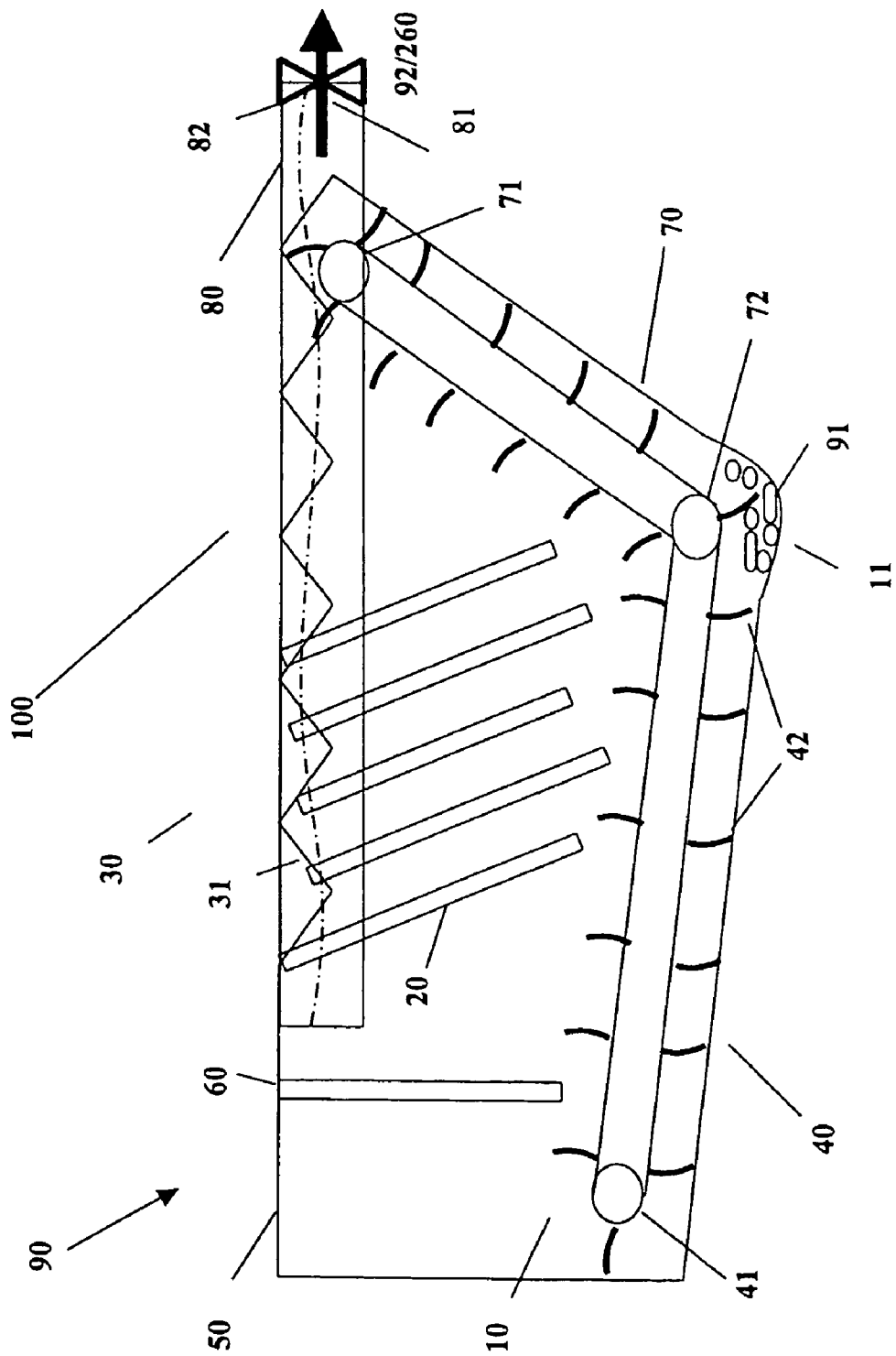
FIG. 1 shows a preferred embodiment of an apparatus in the form of a reclaimer.

Referring to the drawings, an embodiment of a solid matter separation apparatus in the form of a reclaimer 100 is seen in FIG. 1. The reclaimer 100 includes a reservoir in the form of a reclaiming tank 10, which is preferably inclined. However, it is to be understood that it is not an essential feature of the invention for the base of the reclaiming tank to be inclined, as the invention will still work when the base of the reclaiming tank 10 is planar.

The reclaimer 100 is designed to separate desirable solids 91, capable of being reclaimed, from solid laden slurry water 90 passing through the reclaiming tank 10. Examples of these desirable solids are fines, silt, granite and sand.

The term solid laden slurry water includes solids and fines, and the term fines used hereinafter will include particulate solids like silt and sediments.

The reclaiming tank 10 is provided internally with a plurality of plates in a lamella-like arrangement in the form of a series of lamella plates 20, which are preferably inclined, and not horizontal. As seen in FIG. 1, this inclination is preferably between 0 to 180° from the horizontal and preferably not 90°. The plates 20 are adapted to receive part of the solids 91 from the solid laden slurry water 90 as it moves relative to the plates 20.

Some or all of the plates are arranged with a sloping inclination so that any solids 90 received thereon will eventually settle off the plate 20 by gravity as a result of said inclination. However, when the velocity of the liquid between the plates is faster than the settling rate of the solids, the solids will be carried upwards between the plates and out of the tank.

Solid laden slurry water 90 is introduced into the reclaiming tank 10, at the inlet means 50.

To separate fines 92 from solids 91 of the solid laden slurry water 90, the reclaiming tank 10 further includes a liquid-motion generating means in the form of agitation mechanism 40. The agitation mechanism 40 generates a degree of motion in the reservoir relative to the plates 20 by agitating and imparting a velocity to the solid laden slurry water 90.

The velocity, imparted to the liquid is higher than the settling velocity of the fines 92. This causes the fines to be carried by the current of the liquid, and discourages the fines 92 from settling to the bottom of the reservoir.

The agitation mechanism 40 is capable of varying the degree of motion generated in the solid laden slurry water 90 in the reservoir relative to the plates in order to influence the size of solids 91 that is separated from the slurry liquid by the lamella plates 20.

The word "agitation" does not limit the mechanism, that causes movement of the liquid, to be restricted to any one style of motion. For instance, the motion can be continuous in one direction as in the present embodiment, or the liquid motion can be generated by side-to-side reciprocating motion of the agitation mechanism. It is important merely that the agitation mechanism provide the function of generating movement through the liquid.

The choice of the degree of motion, imparted by the mechanism 40, depends on the size of solids 91 that the reclaimer 100 is intended to separate.

For instance, solids 91 that have settling velocities higher than the determined velocity of the agitation mechanism 40 will be caused to sink to the bottom of the reclaiming tank 10.

In contrast, those fines 92 which have settling velocities lower than the velocity, imparted to the solid laden slurry water 90 by the agitating mechanism 40, will be caused to run up the lamella plates 20, and thus be separated from the solids 91.

Thus, the variation in the degree of motion or velocity of the solid laden slurry water 90 relative to the lamella plates 20 can be used to influence the amount and size of solids 91 that is separated from the solid laden slurry water 90 by the lamella plates 20. A user is able to selectively control the liquid-motion generating means to vary the degree of motion or velocity of the liquid relative to the plates as the user desires.

The solid laden slurry water 90 passes in between the lamella plates 20. Hence, the lamella arrangement of the plurality of plates 20 provides a larger effective plate surface per unit volume of reservoir, as compared to having a single plate. This extra surface area of the plates serves to increase the available surface loading area so that the solids 91 can be settled on the plates appropriately.

Fines 92 with low settling velocity will then move up the lamella plates 20, and leave the reclaiming tank 10 through an outlet means 30. In a preferred embodiment, the outlet means includes a series of weirs 31. The slurry water 260 and fines 92 then enter a weir overflow containment device 80, for further reclaiming or processing, as the need be.

To stiffen the lamella plates 20 against warping due to constant impact due to the incoming solid laden slurry water 90, the lamella plates 20 can be kinked or otherwise reinforced to stiffen the lamella plates 20.

A baffle plate 60 may be incorporated into the reclaiming tank 10, to prevent unnecessary agitation to the solid laden slurry water 90, which may occur when the solid laden slurry water 90 is introduced to the reclaimer 100, and into the reclaiming tank 10. Thus, agitation will only be imparted into the reclaiming tank 10 by way of the agitation mechanism 40.

In the embodiment, the motion that arises due to the solid laden slurry water 90 entering the tank 10 is largely turbulent, which is in contrast to the steady largely predictable motion generated by the agitation mechanism 40. Therefore, the baffle plate 60 serves to contain the turbulence behind the plate 60, so that the turbulence does not substantially affect the motion of the liquid in the tank 10.

The solids 91, which settle at the bottom of the reclaiming tank 10, are caused to move to an end of the reclaiming tank 10 by the agitation mechanism 40, preferably to the lower inclined end of the reclaiming tank 10.

The agitation mechanism 40 may be any mechanism that may impart an agitation to the solid laden slurry water 90 in the reclaiming tank. For example, jets of fluid to provide to convey motion to the liquid in the reclaiming tank 10 or a rotating screw in the reclaiming tank to impart the agitation. In the embodiment of FIG. 1, the agitation mechanism 40 includes one or more surface members that are movable through the slurry liquid to generate the degree of motion in the liquid. In the embodiment, the surface members are protrusions 42, but in other modifications the surface members can be plates, paddles, fins or vanes.

In a preferred embodiment, the liquid-motion generating means includes a moveable mounting apparatus in the form of a mechanical conveyor 41 to which the protrusions 42 are mounted and thereby moved through the slurry liquid in the reservoir. The protrusions 42 are spaced evenly on the conveyor 41. However, it is envisioned that the protrusions may be spaced at differing intervals along the conveyor.

The conveyor rotates or cycles the protrusions 42 around a circuit in the reservoir to create the agitation. This rotation may be clockwise, or anti-clockwise, and does not depend on the angle of inclination of the lamella plates 20.

The conveyor 41 also functions as a solid removal mechanism 70 in which movement of the surface members pushes solids 91 that have settled in the reservoir. The conveyor 41 causes the protrusions 42 to sweep the bottom of the reclaiming tank 10, and conveys the sunken solids 91 towards the end of the reclaiming tank 10. In an embodiment, the periphery of the protrusions 91 further include bristles or brushes, to improve the effectiveness of the protrusions 91 in conveying solids out of the reclaiming tank 10.

To reduce the load of the reclaiming tank 10, a mesh (not shown) may be included across the inlet means 50 of the reclaiming tank 10. Thus, the solid laden slurry water 90 will have to go through a preliminary screening through the mesh prior to entering the reclaiming tank 10. The mesh is sized, so as to enable undesirable solids which cannot be reclaimed, that may be present within the solid laden slurry water 90, to be removed before entering the reclaiming tank 10. This will improve the efficiency of the reclaimer 100.

The reclaiming tank 10 has a lower surface that includes an indentation 11 which provides temporary storage for settled solids 91. The protrusion 42 push solids 91 into the indentation 11. The indentation 11, located at the end of the reclaiming tank 10, therefore acts as a settling cave for the swept solids 91.

A solid removal mechanism 70 is situated at the same end of the reclaiming tank 10, to move the solids 91 that have been swept to the indentation 11. In a preferred embodiment, as seen in FIG. 1, this solid removal mechanism is a conveyor system 71.

The lower surface of the reclaiming tank 10 has inclined regions. In the embodiment of FIG. 1, the inclined regions slope down towards the indentation 11.

In FIG. 1, the motion of the protrusions 42 first push the solids 91 towards the indentation 11, and then up and out of the reclaiming tank 10. Thus, the solids 91 are conveyed to an exterior of the reclaiming tank 10 for reclamation or further processing, as the need be.

Figure 2:
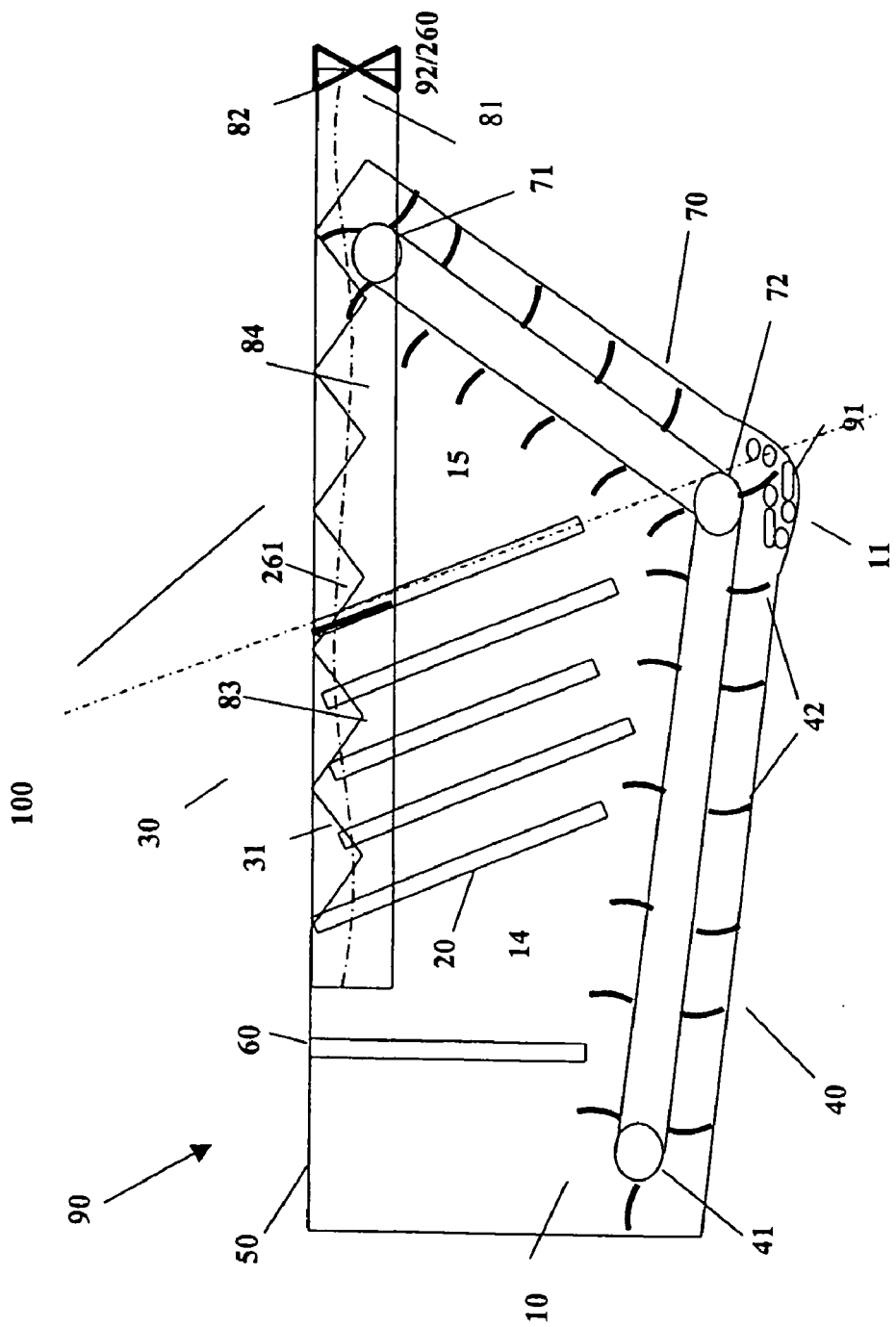
FIG. 2 shows a second preferred embodiment of an apparatus in the form of a reclaimer.

FIG. 2 shows another embodiment of the solid matter separation apparatus 100. The reclaiming tank 10 can be seen as 2 areas. A first area 14, is where the solid laden slurry water 90 experiences a degree of motion by the agitation mechanism 40, so that the solid laden slurry water 90 can move relative to the plates 20. At a second area 15, the solid laden slurry water will only experience a degree of motion by the agitation mechanism 40, and not be caused to move relative to the plates 20.

When the velocity imparted to the liquid is lower than the settling velocity of the fines 92, some fines 92 may still rise up as the settling velocities may vary. Where the lamella plates 20 are present, as in the first area 14, these fines 92 will rise up and move relative to the plates 20, and settle eventually to the bottom of the reservoir. Therefore, the liquid rising up the plates 20 and out of the tank, is clarified water 261.

However, at the second area 15, the liquid rising up and out of the tank 10 will be slurry water 260 and fines 92, as there is no movement relative to the plates 20.

To separate the different quality of output from the first area 14 and the second area 15, the weir overflow containment device 80 is separated so that the clarified water 261 from the first area 14 can be directed out from the apparatus 100, for other uses, through a first weir overflow containment device 83. The slurry water 260 and fines 92 from the second area 15 then enters a second weir overflow containment device 84 for further reclaiming or processing, as the need be.

The inlet means 50 may include means to meter the input solid laden slurry water 90 into the reclaiming tank 10. In an embodiment, a convoluted passage (not shown in the figures) is included, so that the solid laden slurry water 90 introduced into the reclaiming tank 10 will have to initially go through this passage. The convoluted passage effectively increases the effective separation area of the tank 10. In another embodiment, the inlet means 50 may include a hopper or screw (also not shown in the figures) so that the input into the reclaiming tank 10 may be metered or otherwise controlled.

It is envisioned that the agitation mechanism 40, and the solid removal mechanism 70 is a continuous system, in that the mechanical conveyor 41, and the conveyor system 71 share the same shaft 72 at an end, and can be made to rotate at the same frequency. Thus, in the embodiment, the moveable mounting apparatus and the solid removal mechanism are integral to one another, and share a shaft.

Thus, in FIG. 1, some of the solid matter exits the tank 10 via the plates 20, while a portion of the solids 91 settles to the bottom to be swept out by the protrusions 42.

Generally, the plates 20 will be used to remove lighter solids, while the heavier solids would settle to the bottom of the tank 10 to be swept away by the protrusions 42. Thus, the plates are located at an upper region of the reservoir such that the plates tend to receive solids 91 that has not otherwise settled in the tank.

It is envisioned that the shape of the protrusions can be of a trapezoidal shape, as this will minimise the solid matter being swept from the bottom of the tank, to 'skip'. Thus, trapezoidal shaped protrusions can sweep the solid matter more efficiently.

Figure 3:
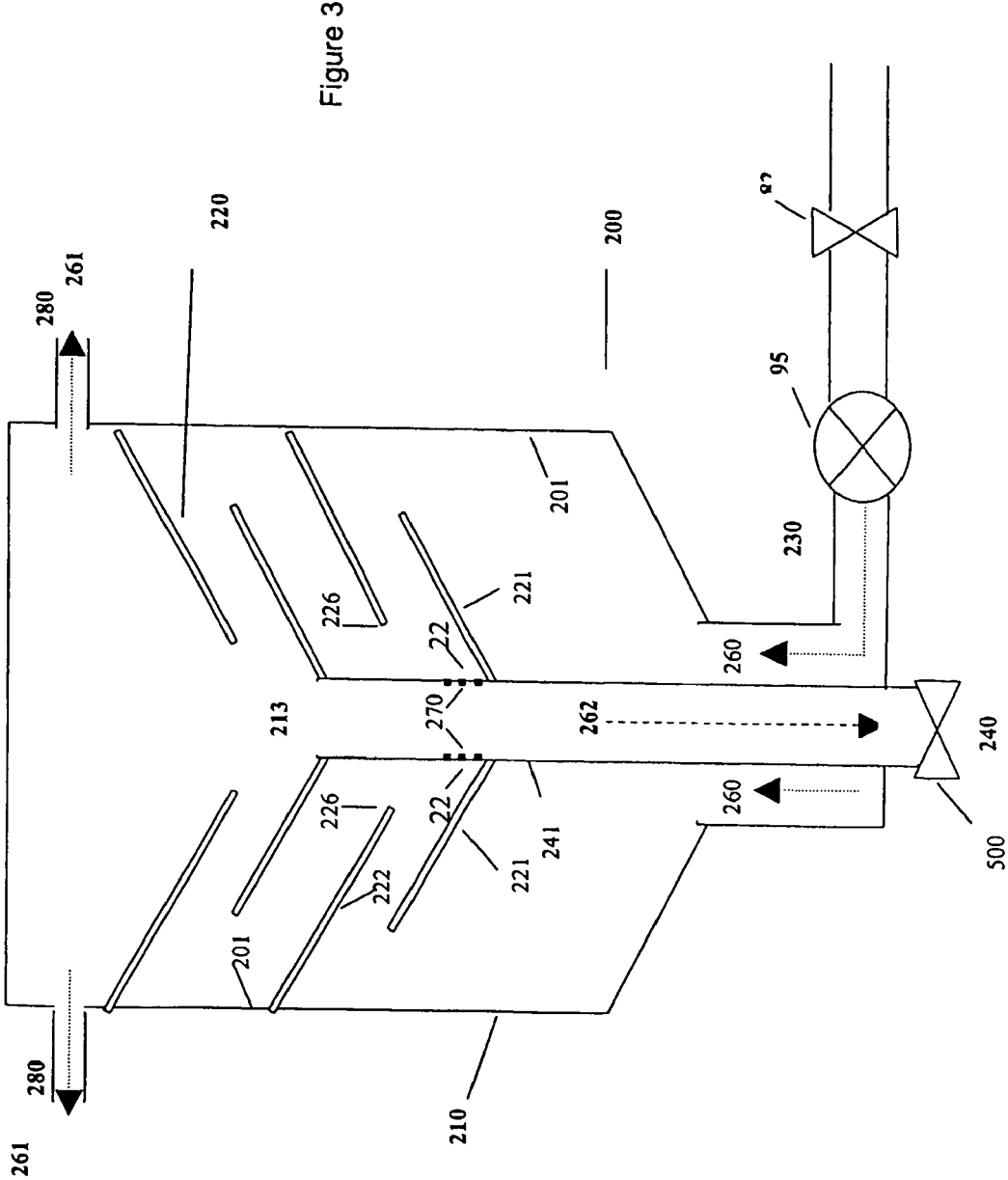
FIG. 3 shows a preferred embodiment of an apparatus in the form of a clarifier.

To further separate fines 92 from the slurry water 260, the slurry water 260 is introduced into another embodiment of a solid matter separation apparatus in the form of a clarifier 200, shown in a preferred embodiment, in a vertical position as seen in FIG. 3.

An inlet 230 of the clarifier 200 is provided for the introduction of slurry water 260 into a clarifying tank 210 via a weir overflow containment device 80. The weir overflow containment device contains the slurry water exiting the reservoir. The weir overflow containment device includes an outlet to allow the weir overflow containment device to be drained.

The clarifying tank 210 has a fines outlet means 262 by which heavier fines 92 can exit the tank, seen in FIG. 3 in the form of a conduit 213, which extends from an exterior of the clarifying tank 210, to an intermediate level within the clarifying tank 210. This conduit 213 is further fitted with a valve 500, so that the conduit 213 can be in an open or closed position.

This other embodiment in FIG. 3 also operates on a principle in which variation of the motion or velocity of liquid relative to the lamella plates can be used to determine the amount and/or size of the solid matter removed from the slurry liquid by the plates. Hence, the liquid-motion generating means includes a fluid-driving mechanism that controls the speed of entry of slurry liquid into the reservoir.

The fluid-driving mechanism serves to induce pressure in the liquid to generate motion, and is in the form of a pump 95 in the embodiment. Alternatively, the pressure can be induced with a propeller or other suitable mechanism.

Slurry water 260 is pumped into the clarifying tank 210 through the inlet 230, using the pump 95. The pump 95 is positioned proximate the inlet 230. The pump 95 can be any pump of the art. The pump head can be varied, in response to a user's need.

The inlet 230 are preferably placed at opposed sides of the solid outlet 240. The solid outlet 240 is preferably positioned centrally within the clarifying tank 200.

Lamella plates 220 are contained within the clarifying tank 210, to increase the surface area of separation for the incoming slurry water 260.

In this embodiment, the lamella plates are in a first and second set.

The first set 221 is where lamella plates 220 protrude from an outer surface 241 of the solid outlet 240.

The second set 222 is where lamella plates 220 protrude from an inner surface 201 of the clarifying tank 210.

The first set and the second set are in alternate positions, such that the slurry water 260 will be caused to move past a first set 221 and then to a second set 222. The plates of the first set interleave with the plates of the second set to form a convoluted passageway therebetween through which the slurry water 260 is able to flow.

Explanation will only be made on a left side of the clarifying tank 210, because the right and left sides of the clarifying tank 210 are a mirror image of each other, and thus, the effects and features of one side will apply equally to both the right side and the left side.

Slurry water 260 is transmitted a velocity due to the pump head of the pump 95. This transmitted velocity is seen to be decreasing as it rises towards the top end of the clarifying tank 210. Thus, heavier fines 92 with higher settling velocities will be caused to settle out first, before fines 92 with lower settling velocities.

The inner surface of the clarifying tank 210 is defined by an inner peripheral surface. Some of the plates 222 of the second set extend from this inner peripheral surface of the tank 210 and protrude partly into the tank. Some of the plates 221 of the first set extend from a support portion in the form of conduit 213 located in the centre of the tank 210 and protrude from the conduit 213 partly into the tank 210.

The conduit 213 actually functions as a solid outlet means 262 for enabling heavier fines 92 to exit the tank 210. In FIG. 3, the conduit 213 extends from outside the tank into an intermediate section inside the tank. In the embodiment, the conduit is positioned centrally within the reservoir.

The plates 221 that extend from the conduit 213 interleave with the plates 222 that extend from the inner peripheral surface of the tank to form said convoluted pathway. As seen in FIG. 3, the convoluted passageway includes generally S-shaped bends and C-shaped bends.

The interleaving of the plates serves to reduce the volume taken up by the arrangement of the plates as compared to a case without the interleaving, and causes the overall clarifying tank 210 be more compact in design.

Upon entering the clarifying tank 210, the slurry water 260 flows through the tank 210 generally in an upward direction with respect to gravity.

The slurry water 260 is caused to run up a first lamella plate 221 of the first set of lamella plates. This first lamella plate is protruding from the outer surface 241 of the conduit 213. At this point, the heavier fines 92 will be caused to settle at a lower end 225 of the first set of lamella plates 221. The plate 221 from the first set has an inclined surface with a solid-matter outlet (shown by dotted lines in the conduit) located at a lower part of the inclined surface.

This lamella plate 221 slopes downwards such that the angle made between the outer surface 241 and the lower end 225 is less than 90°, and in the preferred embodiment, seen at 45°. This angle is preferably maintained throughout the lamella plates of a same side. The lamella plates on the opposing side will similarly make an angle of less than 90° between the outer surface of the conduit 213. This angle is similarly maintained throughout the same side of the clarifying tank 210, and is preferably 45°.

A reason for the inclination of the plates can be seen in the arrangement of plates in FIG. 3. An edge of one or more of the plates is positioned above a surface of another of the plates such that solid matter from the plate 222 in the second set falls off onto the plate 221 in the first set.

Those fines 92, that are not collected on the first plate 221, continue upwards along the convoluted pathway carried by the motion of the slurry water 260.

The conduit 213 is preferably slotted, so that the settled fines 92 at the lower end 225 of the lamella plates can be caused to enter the conduit 213 through the slots 270. These fines 92 will then be able to exit the clarifying tank, leaving the tank with clearer slurry water.

The clearer slurry water 260 by virtue of the pressure induced by the pump 95, will be caused to move further up, to a second set of lamella plates 222. The fines 92 that are separated at that stage will drop off the lower end 226 of the second set 222 and onto the lower end of the first set 221 of the lamella plates. Again, these heavier fines 92 will be caused to enter the conduit 213 via the slots 270 of the conduit 213.

It is to be appreciated that at higher levels of the clarifying tank 210, the pressure induced will gradually decrease and thus, larger fines 92 will be caused to settle out on the lamella plates 220.

This process repeats for a subsequent group (forming a first and second set) of lamella plates where respective slots 270 are incorporated into the conduit 213.

It is to be appreciated that the lamella group need not consist of a first set and a second set, and will equally apply to 2 first sets followed by 2 second sets, or in any numerical combinations. It is enough that the slurry water 260 is caused to travel through inclined lamella plates 220, that will allow the fines 92 to settle out as the slurry water 260 progresses towards a top end of the clarifying tank 210, and becoming clarified water.

However, in the preferred embodiment of FIG. 3, a second further group of lamella plates 220 is adopted.

Finally the clarified water 261 is caused to exit, via the liquid outlet 280, found on opposed sides of the clarifying tank 210. The liquid outlet 280 is located at a top end of the tank 210.

The solid outlet means 262 includes a valve 500 to enable it to be in an open and closed position.

The clarifying tank 210 is maintained in a water level at least above the level of the conduit 213 within the clarifying tank 210, so that the fines 92 exiting the tank via the slots 270 of the conduit 213 will not cause the clarifying tank 210 to suffer pressure or hydraulic losses.

Figure 4:
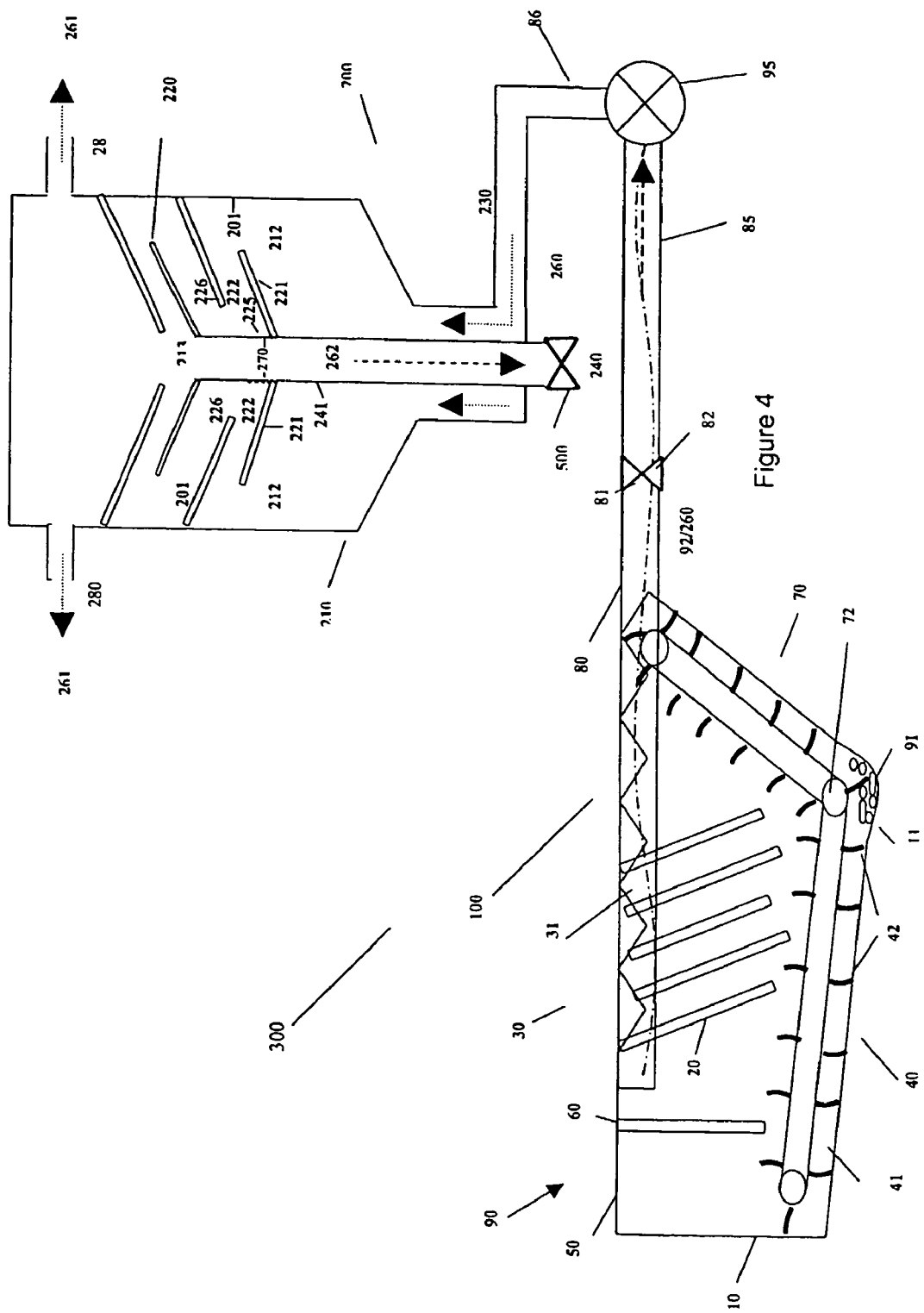
FIG. 4 shows an incorporation of the embodiment of the reclaimer and the embodiment of the clarifier combining to form a reclaiming system.

FIG. 4 shows the incorporation of the reclaimer 100 and the clarifier 200 to form a reclaiming system 300. The solid laden slurry water 90 is introduced through the inlet 50 of the reclaimer 100, to enter the reclaiming tank 10. The reclaiming process is as described above.

The weir overflow containment device 80 is further provided with an opening 81 for the fines 92 and slurry water 260 to exit the weir overflow containment device 80, and to the next process. The weir overflow containment device collects the separated slurry water that exits the reclaimer.

When the valve 82 is in an open position, the fines 92 and slurry water 260 are allowed to exit the weir overflow containment device 80. They are then preferably pumped through a conveying mechanism 85, which consists of a piping system, embodied in FIG. 4 as a pipe system 86. The weir overflow containment device 80 includes a pump 95 which pumps the liquid through an inlet 230 of the clarifier 200, and into the clarifying tank 210. The pump 95 conveys the slurry water collected in the weir overflow containment device to the clarifying tank. The conveying mechanism 85 is adaptable to be attached to the opening 81 of the weir overflow containment device 80, to the inlet 230 of the clarifying tank 210.

It is envisioned that the reclaimer 100 can be used by itself, or incorporated with the clarifier 200, depending on the needs of a user.

Figure 5:
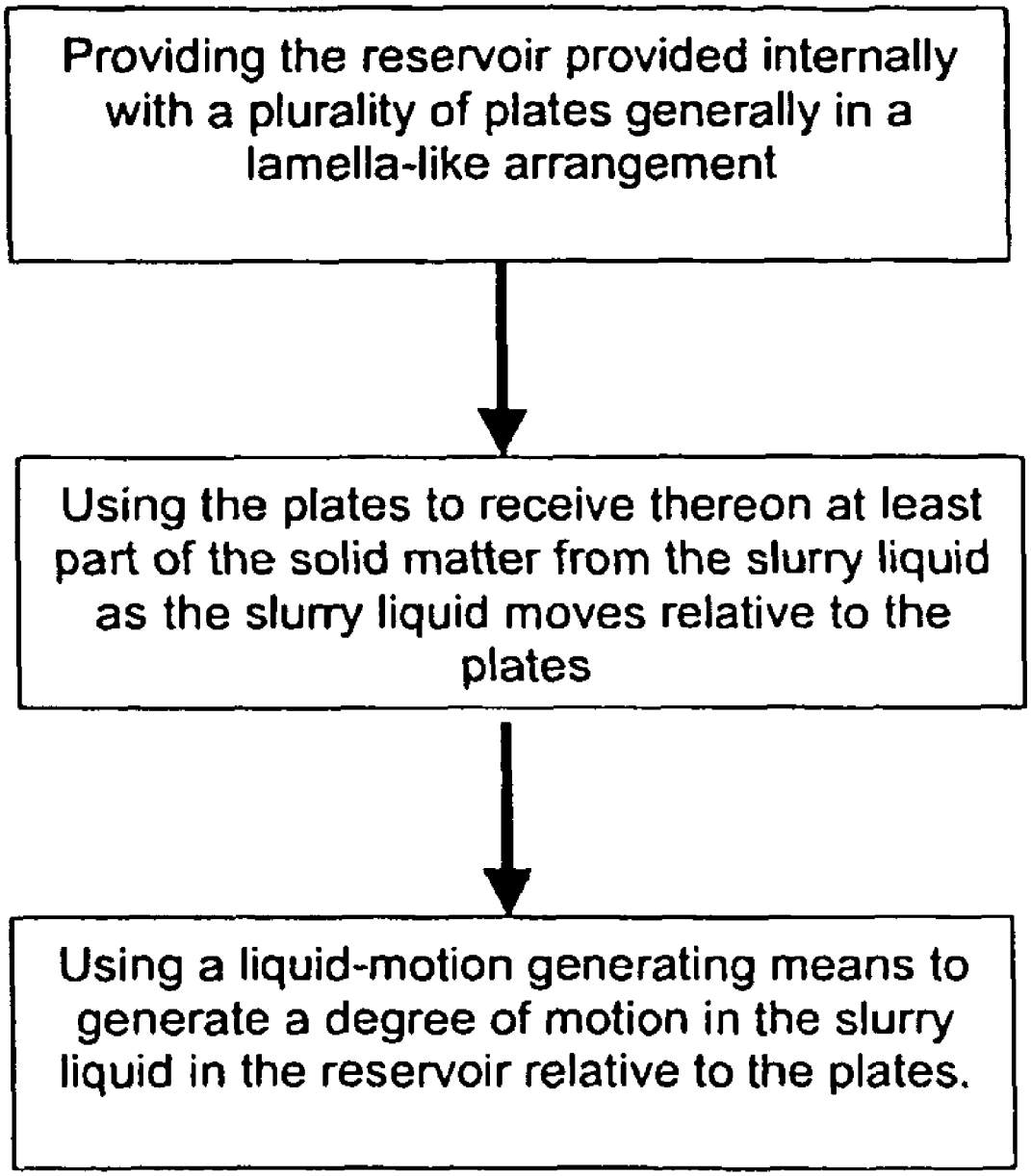
FIG. 5 shows a method of separating solid matter from slurry liquid

FIG. 5 shows the flow chart of a method of separating solid matter from slurry liquid passing through a reservoir of a solid matter separation apparatus of the present invention. The method includes providing the reservoir provided internally with a plurality of plates generally in a lamella-like arrangement so as to increase the effective separation area of the reservoir. The plates provided internally of the reservoir, receive on it at least part of the solid matter from the slurry liquid as the slurry liquid moves relative to the plates. Finally, a liquid-motion generating means is used to generate a degree of motion in the slurry liquid in the reservoir relative to the plates so as to separate the solid matter from the slurry liquid, and producing clarified liquid at the top of the reservoir.

The embodiments have been advanced by way of example only, and modifications are possible within the scope of the invention as defined by the appended claims.

The invention claimed is:

1. A solid matter separation apparatus for separating solid matter from a solid-liquid slurry passing through a reservoir of the apparatus; comprising:
   a. a reservoir provided internally of said apparatus and including a plurality of plates arranged in a lamella-like arrangement;
   b. said plates being adapted to receive thereon at least part of the solid matter from said slurry as said slurry moves relative to said plates;
   c. liquid-motion generating means for generating motion of said slurry in said reservoir relative to the said plates;
   d. means for varying the degree of motion of said slurry relative to said plates for influencing the size of the solid matter which is separated from said slurry; and
   e. a solid removal mechanism joined to the liquid-motion generating means in the reservoir for removing solid, the solid removal mechanism comprising a moveable conveyor extending in a direction upwardly and outwardly of the reservoir,
wherein lower end portions of the plates located further within the reservoir are inclined towards the solid removal mechanism.

2. The apparatus of claim 1 including a plurality of protrusions extending from said generating means into said slurry.

3. The apparatus of claim 1 said liquid-motion generating means comprises a horizontally extending element and a plurality of protrusions extending there from into said slurry.

4. An apparatus of claim 1 wherein said liquid-motion generating means comprises a moveable conveyor to which said protrusions are attached such that said conveyor moves said protrusions through the slurry.

5. The apparatus of claim 1 in combination with a clarifier for clarifying effluent from said reservoir; said clarifier including first and second sets of plates, and wherein the plates of the first set interleave with the plates of the second set to form a convoluted passageway there between through which said slurry flows.

6. The combination of claim 5 wherein the first set of plates and the second set of plates protrude partly into a clarifying tank.

7. The combination of claim 5 wherein the second set of plates extend from an inner surface of the clarifying tank and the first set of plates extend from a support portion in the form of a conduit located in a centre of the clarifying tank.

8. The combination of claim 7 wherein the first and second set of plates are inclined such that when the reservoir effluent flows upwardly in the clarifying tank with respect to gravity and runs up to the first and second set of plates, solid matter settles at a lower end of the first set of plates.

9. The apparatus of claim 7 wherein the conduit is slotted so that settled solid matter at a lower end of the first set of plates is caused to exit the clarifying tank through the conduit slots.

10. The combination of claim 5 wherein said convoluted passageway includes generally S-shape bends.

11. The combination of claim 5 wherein the convoluted passageway includes generally C-shaped bends.

12. The apparatus of claim 5 wherein each of the second set of plates are positioned above a respective plate of the first set of plates such that solid matter in the slurry is capable of flowing downwardly from said second set of plates on to said first set of plates.

13. An apparatus for separating solids from a slurry comprising:
   a. inlet means for loading a flow of said slurry into a reservoir;
   b. said reservoir being a portion of a reclaiming tank which receives and contains the input from the inlet means;
   c. a plurality of plates for increasing the effective separation surface area for improving the separation process, said plates being arranged at an angle with respect to the vertical;
   d. liquid-motion generating means for removing heavier solids from said slurry;
   e. outlet means through which the slurry water with solids removed exits the reservoir;
   f. said liquid-motion generating means including a movable element and a plurality of protrusions carried by said movable element;
   g. wherein said protrusions are non-planar; and
   h. a solid removal mechanism joined to the liquid-motion generating means in the reservoir, the solid removal mechanism comprising a moveable conveyor extending in a direction upwardly and outwardly of the reservoir, wherein lower end portions of the plates located further within the reservoir are inclined towards the solid removal mechanism.

14. The apparatus of claim 13 wherein said liquid-motion generating means includes a variable speed drive means for controlling the degree of motion of the slurry passing through said apparatus.

15. A method of separating solid matter from a slurry liquid passing through a reservoir of a solid matter separation apparatus, comprising:
   a. providing the reservoir internally of the apparatus with a plurality of plates generally in a lamella-like arrangement,
   b. using the plates to receive thereon at least part of the solid matter from the slurry as the slurry moves relative to the plates,
   c. using a liquid-motion generating means to generate a degree of motion in the slurry in the reservoir relative to the plates,
   d. varying the degree of motion of the slurry passing through said reservoir; and
   e. using a solid removal mechanism joined to the liquid-motion generating means in the reservoir for removing solid, the solid removal mechanism comprising a moveable conveyor extending in a direction upwardly and outwardly of the reservoir, wherein lower end portions of the plates located further within the reservoir are inclined towards the solid removal mechanism.

16. The method of claim 15 further comprising the steps of:
   a. introducing effluent from said reservoir which has had a substantial portion of the larger solids removed into a clarifier;
   b. passing said effluent upwardly through said clarifier through a convoluted passage way formed by a plurality of interleaved plates;
   c. removing clarified effluent from the upper portion of the clarifier; and
   d. recovering the effluent with relatively smaller solids from the lower portion of the clarifier.

* * * * *